US010797282B2

(12) United States Patent
Liu

(10) Patent No.: US 10,797,282 B2
(45) Date of Patent: Oct. 6, 2020

(54) BATTERY MODULE WITH IMPROVED CURRENT-FLOW ABILITY

(71) Applicant: MICROVAST POWER SYSTEMS CO., LTD., Huzhou, Zhejiang Province (CN)

(72) Inventor: Shaosong Liu, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 152 days.

(21) Appl. No.: 16/152,375

(22) Filed: Oct. 4, 2018

(65) Prior Publication Data

US 2019/0115571 A1    Apr. 18, 2019

(30) Foreign Application Priority Data

Oct. 12, 2017    (CN) .......................... 2017 1 0946055

(51) Int. Cl.
*H01M 2/10* (2006.01)
*H01M 2/20* (2006.01)
*H01M 2/30* (2006.01)

(52) U.S. Cl.
CPC ....... *H01M 2/1061* (2013.01); *H01M 2/1077* (2013.01); *H01M 2/204* (2013.01); *H01M 2/206* (2013.01); *H01M 2/30* (2013.01)

(58) Field of Classification Search
CPC ...... H01M 2/1061; H01M 2/30; H01M 2/206; H01M 2/204; H01M 2/1077; H01M 2/263; H01M 2/20

USPC .......................................................... 429/152
See application file for complete search history.

(56) References Cited

U.S. PATENT DOCUMENTS

| 2012/0231641 A1 | 9/2012 | Sugai et al. |
| 2014/0065467 A1* | 3/2014 | Choi ............... H01M 2/347 |
| | | 429/158 |
| 2017/0062780 A1 | 3/2017 | Bae |

FOREIGN PATENT DOCUMENTS

| EP | 2698847 A1 | 2/2014 |
| JP | 2006-338934 A | 12/2006 |

* cited by examiner

*Primary Examiner* — Gary D Harris
(74) *Attorney, Agent, or Firm* — Cheng-Ju Chiang

(57) ABSTRACT

A battery module includes multiple cell laminations and a conductive plate. The cell laminations are laminated along vertical direction and includes at least a first cell lamination and a second cell lamination. Each cell lamination includes several cells laminated together and a busbar, the busbar includes a connection portion and a current-flow portion, the connection portion electrically connects with lugs of the cells, and further connects with the current-flow portion. The conductive plate is located beside the cell laminations. A first end of the conductive plate at least electrically connects with the current-flow portion of the busbar in the first cell lamination, and a second end thereof at least electrically connects with the current-flow portion of the busbar in the second cell lamination. The present disclosure provides a battery module which can solve the problem of impossible to consider current-flow ability, energy density and welding effect simultaneously.

18 Claims, 5 Drawing Sheets

BATTERY MODULE WITH IMPROVED CURRENT-FLOW ABILITY

CROSS REFERENCE TO RELATED APPLICATION

The present application is based on and claims priority of Chinese Patent Application No. 201710946055.5, filed on Oct. 12, 2017. The entire disclosure of the above to identified application, including the specification and claims are incorporated herein by reference in its entirety.

FIELD OF THE INVENTION

The present disclosure relates to a battery module.

BACKGROUND OF THE INVENTION

As an environmental-friendly battery, lithium-ion battery has the advantages of high average output voltage, high output power, low self-discharge rate, no memory effect, wide operating temperature range, excellent cycling performance, high charge-discharge efficiency, long service life and no toxic or harmful substances. Theoretically, the charge-discharge of the battery is realized during intercalation/deintercalation behavior of lithium-ions therein while their traveling between an anode and a cathode.

Lithium-ion battery module is generally assembled by the following steps: connecting lithium-ion cells in parallel to form several cell laminations, and then connecting the cell laminations in series to yield the battery module. Conventionally, the parallel connection of the cells is realized by electrically connecting the lugs of the cells with their corresponding busbars; meanwhile, in the cell laminations which are formed by multiple cells laminating together, each cell is connected in parallel via the busbars, and the busbars between different cell laminations are welded together, in this way, the series connection is realized.

As is known that welding metals of same kind would lead to best welding effect, lugs of a cathode or an anode are normally welded to their corresponding busbars with the same kind of materials. Further, if the lugs of the cathode and that of the anode are made of different materials, the materials of their corresponding busbars would be different. Along this, when welding the busbars of different materials directly, it is difficult to consider current-flow ability, energy density and welding effect simultaneously.

SUMMARY OF THE INVENTION

The present disclosure provides a battery module. The battery module includes several cell laminations and a conductive plate. The cell laminations are laminated together along a laminating direction, which includes at least a first cell lamination and a second cell lamination. Each cell lamination includes multiple cells laminated together and a busbar, the busbar includes a connection portion and a current-flow portion, the connection portion electrically connects with lugs of the cells and connects with the current-flow portion. The conductive plate is located beside the cell laminations. A first end of the conductive plate at least electrically connects with the current-flow portion of the busbar in the first cell lamination, and a second end of the conductive plate at least electrically connects with the current-flow portion of the busbar in the second cell lamination. The first end and the second end of the conductive plate are opposite to each other along the laminating direction.

In one embodiment, there is one current-flow portion arranged in the busbar, and the number of the conductive plate is one.

The connection portion of the busbar refers to a portion of the busbar which connects with the lugs of the cells; the current-flow portion refers to the portion of the busbar other than that of the connection portion, and the busbar mainly transfers current through the current-flow portion. An orientation of the connection portion and the current-flow portion is perpendicular to a laminate direction of the cells. Series/parallel connection of multiple cells are realized by connecting the lugs to the busbar, and series/parallel connection of multiple cell laminations is realized by connecting the conductive plate(s) with the busbar.

In one embodiment, there is one current-flow portion arranged in the busbar, and the number of the conductive plate is at least two.

In one embodiment, a length direction of the current-flow portion is the same as a laminate direction of the cells.

In one embodiment, the conductive plate comprises a first conductive plate and a second conductive plate, the first conductive plate comprises a first end and a second end opposite to each other along the laminating direction, the first end of the first conductive plate electrically connects with the first current-flow portion of the busbar in the first cell lamination, and the second end of the first conductive plate electrically connects with the first current-flow portion of the busbar in the second cell lamination; the second conductive plate comprises a first end and a second end opposite to each other along the laminating direction, and the first end of the second conductive plate electrically connects with the second current-flow portion of the busbar in the first cell lamination, and the second end of the second conductive plate electrically connects with the second current-flow portion of the busbar in the second cell lamination.

The first conductive plate contacts with the middle part of the first current-flow portion along the laminating direction, and the second conductive plate contacts with the middle part of the second current-flow portion along the laminating direction.

In one embodiment, lug-holes are mounted in the connection portion, and lugs of the cells electrically connects with the connection portion through the lug-holes.

There are multiple lug-holes arranged in the connection portion, which helps to realize the connection of the cells. The lug-holes are arranged at positions of the connection portion corresponding to that of the lugs of the cells; the portions of the lugs that pass through the lug-holes are bent to contact with the connection portion, and are fixed to the connection portion by welding.

In one embodiment, the conductive plate contacts with the middle part of the current-flow portion along a length direction.

The conductive plate contacts with the current-flow portion to realize electrical connection and is fixed to the current-flow portion by welding. The conductive plate contacts with the middle of the current-flow portion along a length direction, which makes the current in the busbar to accumulate towards the middle part of the current-flow portion along the length direction. This would reduce a maximum current in the current-flow portion, facilitate to decrease a thickness of the busbar, and finally facilitate to improve an energy density of the battery module.

In one embodiment, the conductive plate at least covers the current-flow portion of the busbar.

In one embodiment, the conductive plate contacts with a side/sides of the busbar away from the cells and covers the busbar.

The coverage of the busbar by the conductive plate would improve cross-sectional area and current-flow ability of the conductive plate, and facilitate to reduce the thickness of the busbar and improve current-flow ability between two busbars.

In one embodiment, the current-flow portion includes a first current-flow portion and a second current-flow portion, the first current-flow portion and the second current-flow portion locate at opposite sides of the busbar, the connection portion is sandwiched between the first current-flow portion and the second current-flow portion. The conductive plate includes a first conductive plate and a second conductive plate, a first end of the first conductive plate electrically connects with the first current-flow portion of the busbar in the first cell lamination, and a second end of the first conductive plate electrically connects with the first current-flow portion of the busbar in the second cell lamination; and a first end of the second conductive plate electrically connects with the second current-flow portion of the busbar in the first cell lamination, and a second end of the second conductive plate electrically connects with the second current-flow portion of the busbar in the second cell lamination.

Each busbar of either cell lamination is electrically connected to the first conductive plate and the second conductive plate simultaneously, the first conductive plate connects to the first current-flow portion of each busbar in both cell laminations, the second conductive plate connects to the second current-flow portion of each busbar in both cell laminations. This arrangement facilitates to further improve the current-flow ability of the conductive plate and reduce the thickness of the busbar.

In one embodiment of the present disclosure, the first conductive plate contacts with a middle part of the first current-flow portion along a length direction, and the second conductive plate contacts with a middle part of the second current-flow portion along the length direction.

The contact between the first conductive plate and the middle part of the first current-flow portion along the length direction realizes electrical connection therebetween, and further realizes fixed connection by welding; the contact between the second conductive plate and the middle part of the second current-flow portion along the length direction realizes electrical connection therebetween, and further realizes fixed connection therebetween by welding.

In one embodiment, the conductive plate is made of conductive metal plate. In another embodiment, the conductive plate is made of copper plate or aluminum plate.

The electrical connection between the busbar of the first cell lamination and that of the second cell lamination is realized by the conductive plate, and conductive plate electrically connects both busbars. A material of both busbars is different, one is aluminum busbar, and the other is copper busbar.

The material of cathode lugs is aluminum, and that of anode lugs is copper. The cathode lugs electrically connect with a busbar made of aluminum, i.e., aluminum busbar. The anode lugs electrically connect with a busbar made of copper, i.e., copper busbar. If the material of the conductive plate is same as that of the cathode lugs or anode lugs, welding quality between the conductive plate and the busbar would be greatly improved.

In one embodiment, the conductive plate is fixedly connected to the current-flow portion of the busbar by ultrasonic welding, polymer diffusion welding or brazing/soldering.

In one embodiment of the present disclosure, the busbar of one cell lamination and that of another cell lamination are arranged one after another along a laminate direction of the cells.

In one embodiment of the present disclosure, a contact area between the conductive plate and single busbar is no less than 5 $mm^2$.

In one embodiment of the present disclosure, a minimum current-flow area of the conductive plate is no less than 5 $mm^2$.

In one embodiment, a thickness of the conductive plate is no larger than, i.e., less than or equals to, 1.5 mm, and a thickness direction of the conductive plate is parallel to that of the busbar.

In one embodiment of the present disclosure, the current-flow portion includes a first current-flow portion and a second current-flow portion, the first current-flow portion and the second current-flow portion lie in opposite sides of the same busbar, and the connection portion is sandwiched between the first current-flow portion and the second current-flow portion.

In one embodiment, the number of the conductive plate is one, the conductive plate includes a first edge side and a second edge side opposite to each other and parallel to the laminating direction; the first edge side of the conductive plate electrically connects with the first current-flow portions of different busbars, and the second edge side of the conductive plate electrically connects with the second current-flow portions of said different busbars above. That is, as far as different busbars, an edge side of the conductive plate electrically connects with the first current-flow portions of different busbars, and an edge side thereof electrically connects with the second current-flow portions of different busbars. Different busbars are connected by one single conductive plate, which helps to improve the current-flow ability between different busbars.

In one embodiment, the conductive plate includes a first conductive plate and a second conductive plate, the first conductive plate includes a first end and a second end opposite to each other along the laminating direction, the first end of the first conductive plate electrically connects with the first current-flow portion of the busbar in the first cell lamination, and the second end of the first conductive plate electrically connects with the first current-flow portion of the busbar in the second cell lamination; the second conductive plate includes a first end and a second end opposite to each other along the laminating direction, and the first end of the second conductive plate electrically connects with the second current-flow portion of the busbar in the first cell lamination, and the second end of the second conductive plate electrically connects with the second current-flow portion of the busbar in the second cell lamination.

The first conductive plate includes an edge side away from the second conductive plate, which is parallel to the laminating direction; the second conductive plate includes an edge side away from the first conductive plate, which is also parallel to the laminating direction; as far as each single busbar, the edge side of the first conductive plate electrically connects with the first current-flow portion of the busbar, and the edge side of the second conductive plate electrically connects with the second current-flow portion of the same busbar.

As far as different busbars, the first end of the conductive plate electrically connects with the first current-flow portion of one busbar, and the second end of the same conductive plate electrically connects with the second current-flow portion of different busbars.

The present disclosure has the following advantages: the electrical connection of the busbars between different cell laminations is realized by conductive plate(s), which helps to improve the current-flow ability of the busbars; it would facilitate to reduce the thickness of the busbars and improve the energy density, and improve the current-flow ability of the busbars simultaneously. Besides, busbars of different cell laminations are connected by conductive plate(s), which helps to realize reliable welding at low cost, especially welding of the busbars made of different materials.

DETAILED DESCRIPTION OF PREFERRED EMBODIMENTS

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

Embodiment 1

Figure 1:
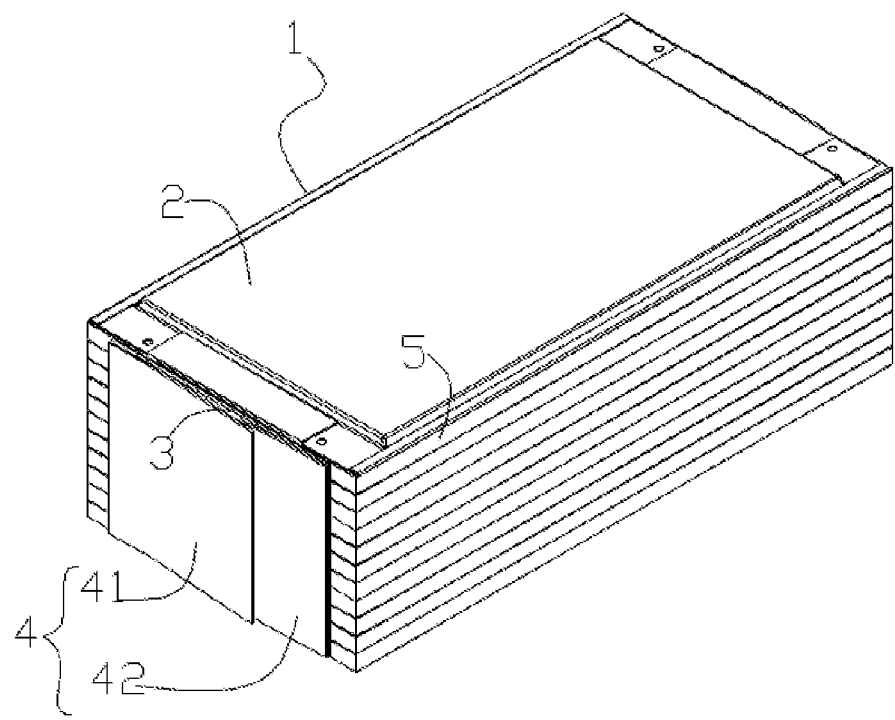
FIG. 1 is an isometric view illustrating a battery module in the present disclosure.
Figure 2:
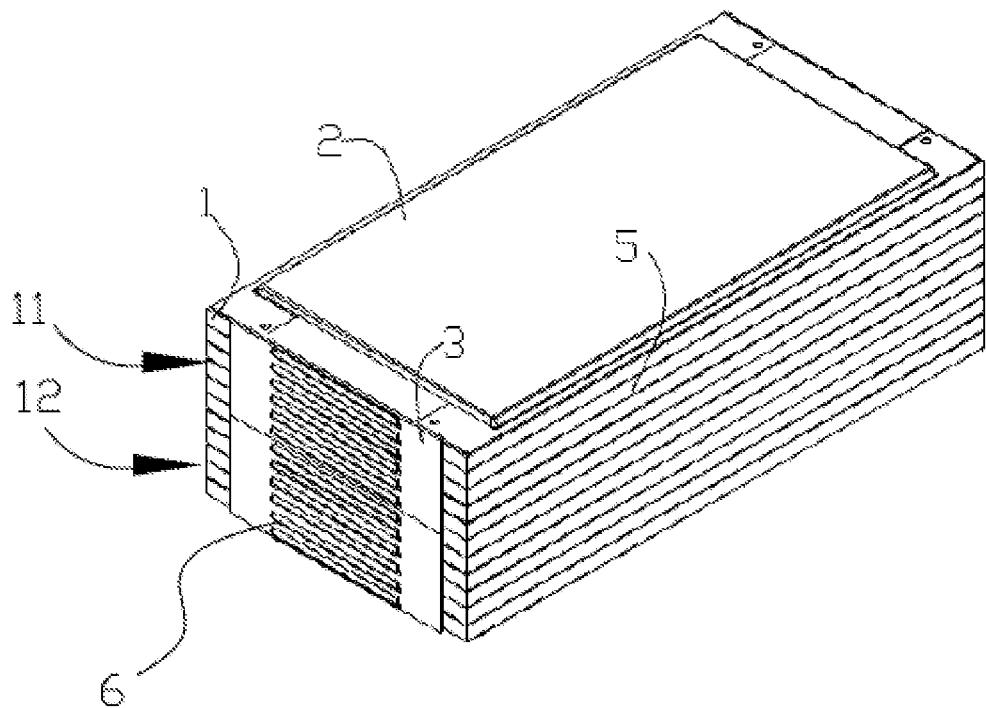
FIG. 2 is an isometric view illustrating a cell lamination in the present disclosure.

As shown in FIGS. 1 and 2, a battery module is provided in this embodiment, which includes a conductive plate 4 and several cell laminations 1. The conductive plate 4 is mounted beside the cell laminations 1 and electrically connects thereto. Please note that there is no limitation on the number of the cell laminations 1. To facilitate the expression and help understand the invention, the number of the cell laminations 1 are hereinafter taken two as an example, as shown in embodiment 1. Please refers to FIG. 2, the cell laminations 1 includes at least a first cell lamination 11 and a second cell lamination 12 stacked along a laminating direction; in this particular example as shown in FIGS. 1 and 2, the first cell lamination 11 is located above the second cell lamination 12. Each of the cell laminations 1 includes multiple cells 2 laminated together along the laminating direction and a busbar 3. The cells 2 are mounted in a frame 5 to prevent the cells 2 from shortcut, and the busbar 3 is fixed to the frame 5. The busbar 3 of the first cell lamination 11 and that of the second cell lamination 12 are arranged one after another along the laminating direction, that is, arranged vertically as shown in FIG. 2.

Figure 3:
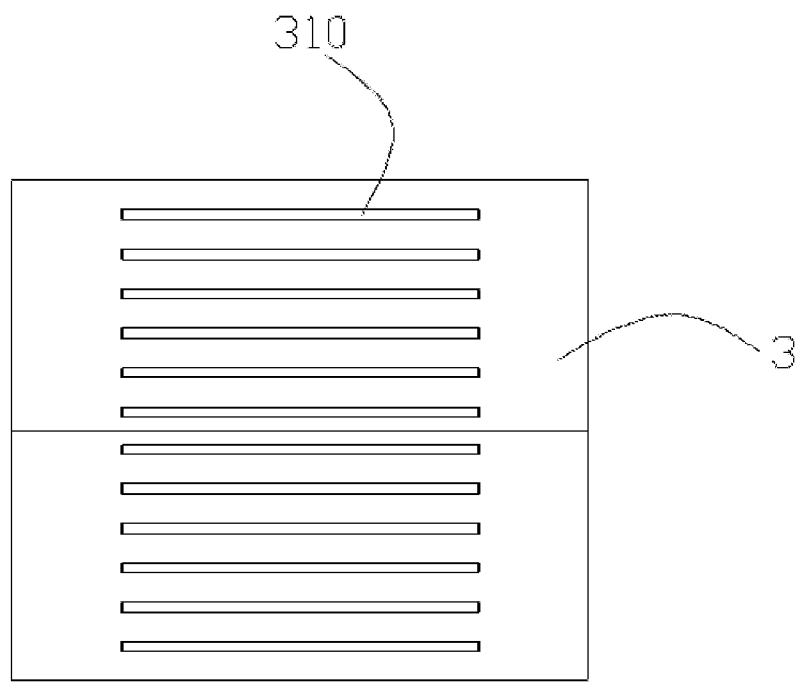
FIG. 3 is a schematic diagram illustrating the busbars of the battery module.
Figure 4:
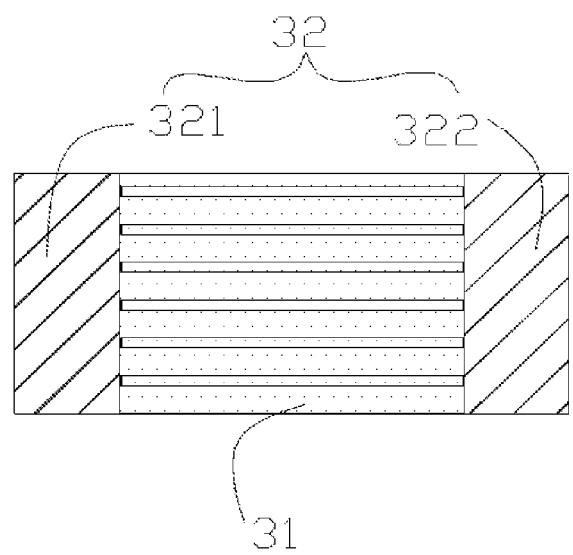
FIG. 4 is a schematic diagram illustrating one busbar in the present disclosure.

As shown in FIGS. 2-4, each busbar 3 includes a connection portion 31 and a current-flow portion 32, and the connection portion 31 connects with the current-flow portion 32, the connection portion 31 further electrically connects with lugs 6 of the cells 2. The lugs 6 are part of the cells 2, arranged on both sides or at least one side of the cells 2, such lugs 6 are metallic conductors used to electrically lead out the anode and/or the cathode from the cells 2. A length direction of the current-flow portion 32 is the same as the laminating direction of the cell 2.

As shown in FIGS. 3 and 4, lug-holes 310 are arranged in the connection portion 31, which are through holes opened in the connection portion 31, and the lugs 6 of the cells 2 pass through the lug-holes 310 and electrically connects with the connection portion 31. The shape of the lug-holes 310 is consistent with that of the lugs 6 of the cells 2, for example, the lug-holes 310 are bar-shaped or rectangle to match with the shape of the cells 2 in embodiment 1.

As shown in FIG. 4, the current-flow portion 32 includes a first current-flow portion 321 and a second current-flow portion 322, the first current-flow portion 321 and the second current-flow portion 322 lie in two opposite sides of the busbar 3, and the connection portion 31 is sandwiched between the first current-flow portion 321 and the second current-flow portion 322.

As shown in FIGS. 1, 3-5 and 8, a conductive plate 4 is located beside the cell laminations 1. One end, i.e., a first end 412, of the conductive plate 4 electrically connects with the current-flow portion 32 of the first cell lamination 11, and the other end, i.e., a second end 413, of the conductive plate 4 electrically connects with the current-flow portion 32 of the second cell lamination 12. The first end 412 and the second end 413 are opposite to each other and are along the laminating direction.

A contact area between the conductive plate 4 and single busbar 3 is not less than 5 mm$^2$, and minimum current-flow area of the conductive plate 4 is not less than 5 mm$^2$. The current-flow area refers to a cross-sectional area of the conductive plate 4, wherein the cross-section of the conductive plate 4 is parallel to a head surface of the first conductive plate 41 or the second conductive plate 42 in FIG. 7, that is, parallel to the laminate direction.

As shown in FIGS. 4-7, the conductive plate 4 includes a first conductive plate 41 and a second conductive plate 42, an edge side 411 of the first conductive plate 41 that is away from the second conductive plate 42 electrically connects with the first current-flow portion 321, and an edge side 421 of the second conductive plate 42 that is away from the first conductive plate 41 connects with the second current-flow portion 322. Further, along the laminating direction, the first conductive plate 41 includes a first end 412 and a second end 413 opposite to each other, similarly, the second conductive plate 42 includes a first end 422 and a second end 423 opposite to each other along the laminating direction. The first end 412 of the first conductive plate 41 electrically connects with the first current-flow portion 321 of the first cell lamination 11, and the second end 413 thereof electrically connects with the first current-flow portion 321 of the second cell lamination 12; meanwhile, the first end 422 of the second conductive plate 42 electrically connects with the second current-flow portion 322 of the first cell lamination 11, and the second end 423 of the second conductive plate 42 electrically connects with the second current-flow portion 322 of the second cell lamination 12.

A contact area between the first conductive plate 41 and each first current-flow portion 321 is no less than 2.5 mm$^2$, and a minimum current-flow area of the first conductive plate 41 is no less than 2.5 mm$^2$; meanwhile, the contact area between the second conductive plate 42 and each second current-flow portion 322 is no less than 2.5 mm$^2$, and the minimum current-flow area of the second conductive plate 42 is no less than 2.5 mm$^2$.

Besides, the conductive plate 4 contacts with the middle part of the current-flow portion 32 in the length direction, i.e., the laminating direction. In detail, the first conductive plate 41 contacts with the middle part of the first current-flow portion 321 along the length direction, i.e., the laminating direction; and the second conductive plate 42 contacts with the middle part of the second current-flow portion 322 along the length direction. A thickness of the conductive plate 4 is no more than 1.5 mm, and a thickness direction of the conductive plate 4 is parallel to that of the busbar 3.

Figure 5:
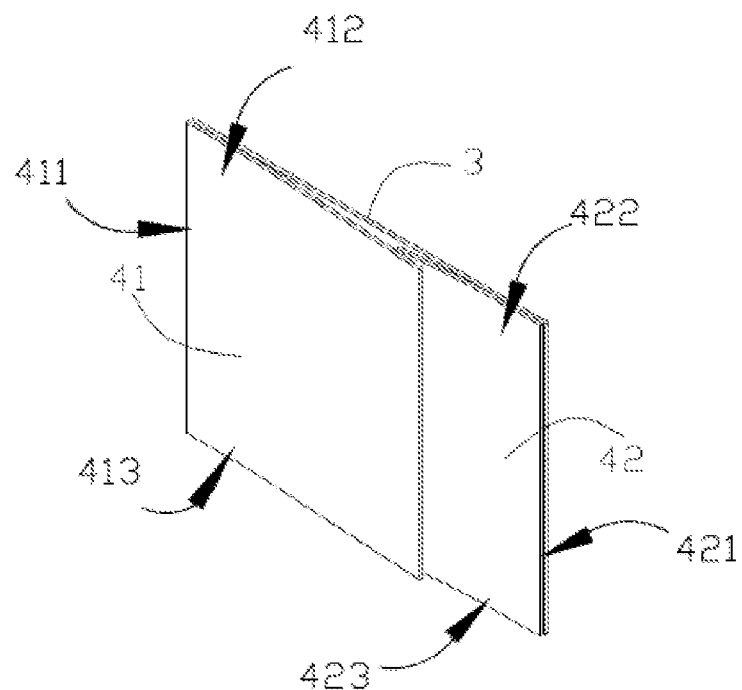
FIG. 5 is an isometric view illustrating conductive plates and the busbar of embodiment 1.
Figure 6:
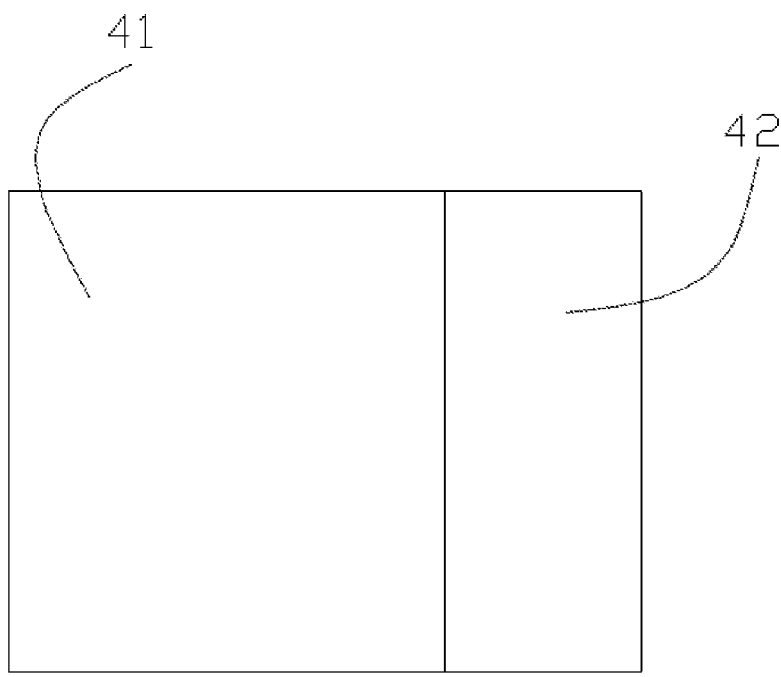
FIG. 6 is a schematic front view illustrating the conductive plates and the busbar.
Figure 7:
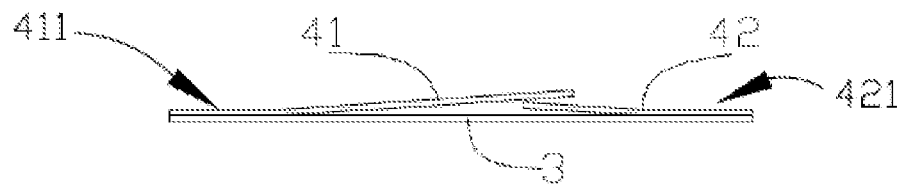
FIG. 7 is a schematic top view illustrating the conductive plates and the busbar.

As shown in FIGS. 1 and 4-7, the conductive plate 4 at least covers the current-flow portion 32 of the busbar 3; preferably, the conductive plate 4 contacts with the sides of the busbars 3 away from the cells 2 and covers the busbar 3. To be more specific, as shown in FIGS. 5-7, the edge side 411 of the first conductive plate 41 away from the second conductive plate 42 contacts with and at least covers the corresponding busbar 3 of the same side, it further extends along the direction to the second conductive plate 42 to meet it. Meanwhile, the edge side 421 of the second conductive plate 42 away from the first conductive plate 41 contacts with and at least covers the corresponding busbar 3 of the same side, and further extends along the direction to the first conductive plate 41 to meet it.

In this embodiment, the conductive plate 4 is made of conductive metal plate. For example, it is made of copper plate or aluminum plate.

The conductive plate 4 is fixed to the current-flow portion 32 of the busbar 3 by ultrasonic welding, polymer diffusion welding or brazing/soldering.

Embodiment 2

Figure 8:
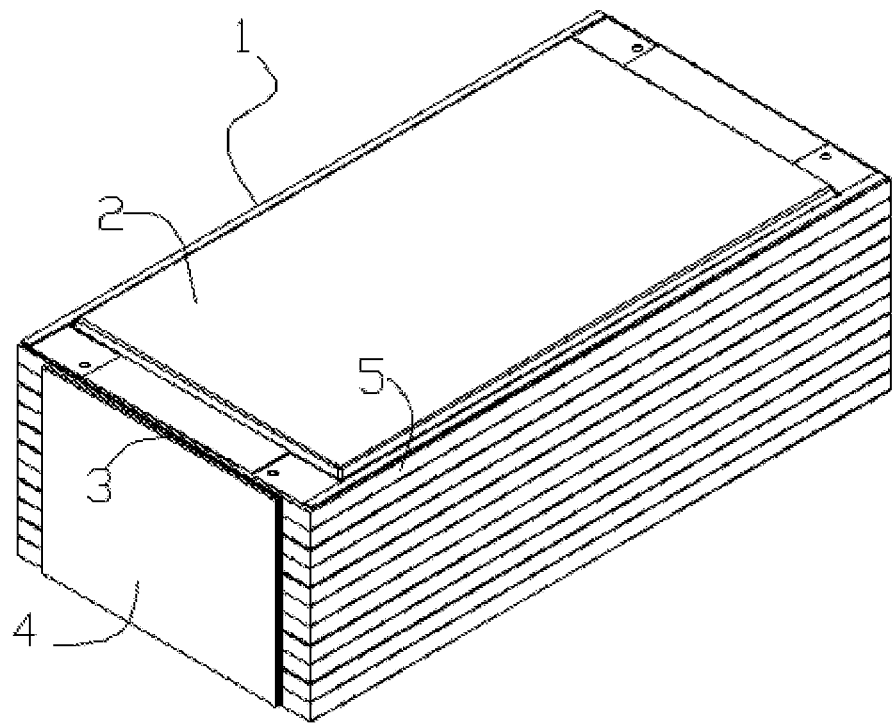
FIG. 8 is an isometric view illustrating the battery module in embodiment 2.

As shown in FIGS. 2 and 8, a battery module is provided. The battery module includes a conductive plate 4 and several cell laminations 1. Each cell lamination 1 includes a busbar 3 and multiple laminated cells 2. The conductive plate 4 contacts with at least one side of the busbar 3 away from the cells 2 and covers the busbar 3.

As shown in FIGS. 2-4, the busbar 3 includes a connection portion 31 and a current-flow portion 32, wherein the connection portion 31 connects with the current-flow portion 32. Lug-holes 310 are mounted in the connection portion 31, lugs 6 are arranged at both sides or at least one side of each cell 2, and the lugs 6 of the cells 2 pass through the corresponding lug-holes 310 and electrically connect with the connection portion 31, one lug 6 inserts into one corresponding lug-hole 310. A length direction of the current-flow portion 32 is the same as a laminating direction of the cells 2.

As shown in FIGS. 3-4 and 8-9, one end of the conductive plate 4 at least electrically connects with the current-flow portion 32 of the busbar 3, and the other end of the conductive plate 4 at least electrically connects with the current-flow portion 32 of the other busbar 3. Besides, the conductive plate 4 contacts with the middle part of the current-flow portion 32 along the length direction, i.e., the laminating direction.

Figure 9:
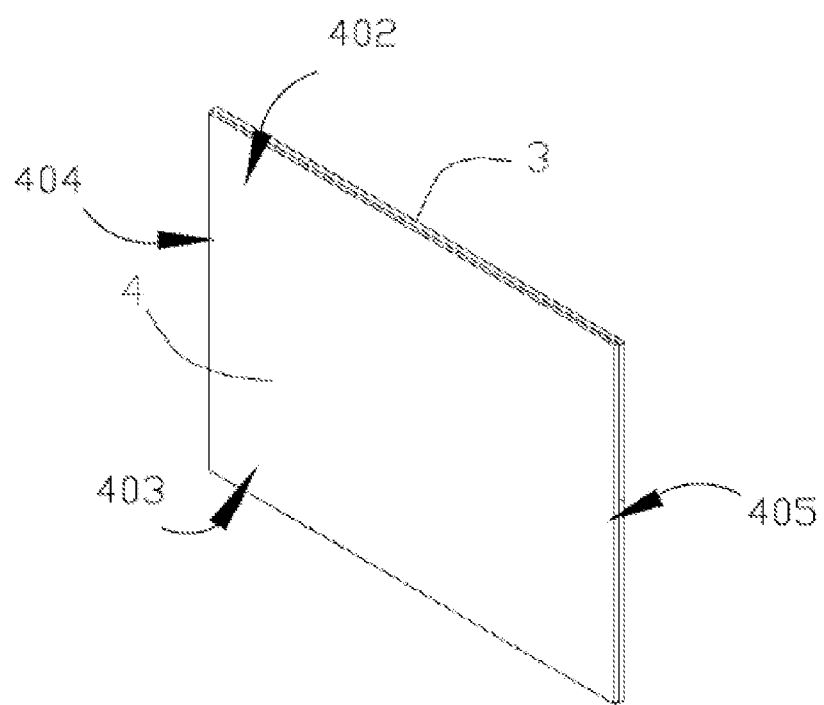
FIG. 9 is an isometric view illustrating the conductive plate and the busbar in embodiment 2.

To be more specific, as shown in FIGS. 3-4, the current-flow portion 32 includes a first current-flow portion 321 and a second current-flow portion 322, and the first current-flow portion 321 and the second current-flow portion 322 are located at opposite side of the busbar 3. The connection portion 31 is sandwiched between the first current-flow portion 321 and the second current-flow portion 322. As shown in FIGS. 8-9, there is one conductive plate 4 in embodiment 2, and the conductive plate 4 has a first end 402 and a second end 403 opposite to each other along the laminating direction. Said "one end" above refers to the first end 402, said "the other end" above refers to the second end 403. That is, one end, i.e., the first end 402, of the conductive plate 4 at least electrically connects with the current-flow portion 32 of the busbar 3 located on the first current-flow portion 321, and the other end, i.e., the second end 403, of the conductive plate 4 at least electrically connects with the current-flow portion 32 of the other busbar 3 locating at the second current-flow portion 322.

In summary, as far as different cell laminations 1, the conductive plate 4 electrically connects with the first current-flow portions 321 of different busbars 3 laminated along the laminating direction, and meanwhile connects with the second current-flow portions 322 of different busbars 3 above along the laminating direction. In detail, in this embodiment, one conductive plate 4 is provided, which includes a first edge side 404 and a second edge side 405 opposite to each other, and both edge sides 404, 405 are perpendicular to the first end 402 and the second end 403. The first edge side 404 of the conductive plate 4 electrically connects with the first current-flow portions 321 of different busbars 3, and the second edge side 405 of the conductive plate 4 electrically connects with the second current-flow portions 322 of those different busbars 3. That is, different busbars 3 are electrically connected by single conductive plate 4, which helps to improve the current-flow ability between different busbars 3.

Meanwhile, as far as single first cell lamination 11, the conductive plate 4 electrically connects with both the first current-flow portion 321 and the second current-flow portion 322 of the same busbar 3; similarly, as far as single second cell lamination 12, the conductive plate 4 electrically connects with the first current-flow portion 321 and the second current-flow portion 322 of the same busbar 3. That is, the first edge side 404 of the conductive plate 4 electrically connects with the first current-flow portion 321 of the busbar 3, and the second edge side 405 of the conductive plate 4 electrically connects with the second current-flow portion 322 of the same busbar 3.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A battery module, comprising:
several cell laminations laminated together along a laminating direction, which comprises at least a first cell lamination and a second cell lamination, each cell lamination comprises multiple cells laminated together and a busbar, the busbar comprises a connection portion and a current-flow portion, the connection portion electrically connects with lugs of the cells, and connects with the current-flow portion; and a conductive plate located beside the cell laminations, the conductive plate is a single piece with different portions thereof being made of same material, a first end of the conductive plate at least electrically connects with the current-flow portion of the busbar in the first cell lamination, and a second end of the conductive plate at least electrically connects with the current-flow portion of the busbar in the second cell lamination, the first end and the second end thereof are opposite to each other along the laminating direction.

2. The battery module according to claim 1, wherein the current-flow portion of each busbar comprises a first current-flow portion and a second current-flow portion, the first current-flow portion and the second current-flow portion locate at opposite sides of the busbar, the connection portion is sandwiched between the first current-flow portion and the second current-flow portion.

3. The battery module according to claim 2, wherein the conductive plate comprises a first conductive plate and a second conductive plate, the first conductive plate comprises a first end and a second end opposite to each other along the laminating direction, the first end of the first conductive plate electrically connects and contacts with the first current-flow portion of the busbar in the first cell lamination, and the second end of the first conductive plate electrically connects and contacts with the first current-flow portion of the busbar in the second cell lamination; the second conductive plate comprises a first end and a second end opposite to each other along the laminating direction, and the first end of the second conductive plate electrically connects and contacts with the second current-flow portion of the busbar in the first cell lamination, and the second end of the second conductive plate electrically connects and contacts with the second current-flow portion of the busbar in the second cell lamination.

4. The battery module according to claim 3, wherein the first conductive plate contacts with the middle part of the first current-flow portion along the laminating direction, and the second conductive plate contacts with the middle part of the second current-flow portion along the laminating direction.

5. The battery module according to claim 3, wherein the first conductive plate further comprises a left end away from the second conductive plate, which is parallel to the laminating direction and perpendicular to the first end; the second conductive plate further comprises a right end away from the first conductive plate, which is also parallel to the laminating direction and perpendicular to the first end; the left end of the first conductive plate electrically connects with the first current-flow portion of the busbar, and the right end of the second conductive plate electrically connects with the second current-flow portion of the same busbar.

6. The battery module according to claim 3, wherein the first end of the conductive plate electrically connects with the first current-flow portion of one busbar, and the second end of the same conductive plate electrically connects with the first current-flow portion of different busbars.

7. The battery module according to claim 2, wherein the number of the conductive plate is one, the conductive plate comprises a left end and a right end opposite to each other and parallel to the laminating direction; the left end of the conductive plate electrically connects with the first current-flow portions of different busbars, and the right end of the conductive plate electrically connects with the second current-flow portions of said different busbars above.

8. The battery module according to claim 7, wherein the conductive plate comprises a first end and a second end opposite to each other along the lamination direction, the first end of the conductive plate electrically connects with the first current-flow portion and the second current-flow portion of the one busbar separately; and the second end of the conductive plate electrically connects with the first current-flow portion and the second current-flow portion of another busbar separately.

9. The battery module according to claim 1, wherein the conductive plate contacts with a side/sides of the busbar away from the cells and covers the busbar.

10. The battery module according to claim 1, wherein lug-holes are mounted in the connection portion, and the lugs of the cells electrically connect with the connection portion through the lug-holes.

11. The battery module according to claim 1, wherein the conductive plate contacts with a middle part of the current-flow portion along the laminating direction.

12. The battery module according to claim 1, wherein the conductive plate at least covers the current-flow portion of the busbar.

13. The battery module according to claim 1, wherein a contact area between the conductive plate and single busbar is no less than 5 mm$^2$.

14. The battery module according to claim 1, wherein a minimum current-flow area of the conductive plate is no less than 5 mm$^2$.

15. The battery module according to claim 1, wherein the conductive plate is made of conductive metal plate.

16. The battery module according to claim 1, wherein the conductive plate is made of copper plate or aluminum plate.

17. The battery module according to claim 1, wherein the conductive plate is fixed to the current-flow portion of the busbar by ultrasonic welding, polymer diffusion welding or brazing/soldering.

18. The battery module according to claim 1, wherein the busbar is located between the conductive plate and the cell laminations and contacts with both.

* * * * *